United States Patent
Kato et al.

(10) Patent No.: US 9,040,196 B2
(45) Date of Patent: May 26, 2015

(54) ALKALINE PRIMARY BATTERY

(75) Inventors: Susumu Kato, Osaka (JP); Yasuhiko Syoji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 761 days.

(21) Appl. No.: 13/378,843

(22) PCT Filed: May 20, 2011

(86) PCT No.: PCT/JP2011/002834
§ 371 (c)(1),
(2), (4) Date: Dec. 16, 2011

(87) PCT Pub. No.: WO2012/046363
PCT Pub. Date: Apr. 12, 2012

(65) Prior Publication Data
US 2012/0171565 A1    Jul. 5, 2012

(30) Foreign Application Priority Data

Oct. 7, 2010  (JP) ................. 2010-227647

(51) Int. Cl.
*H01M 6/04* (2006.01)
*H01M 4/10* (2006.01)
(Continued)

(52) U.S. Cl.
CPC *H01M 4/10* (2013.01); *H01M 4/12* (2013.01); *H01M 4/42* (2013.01); *H01M 4/50* (2013.01); *H01M 6/085* (2013.01); *H01M 2004/021* (2013.01); *H01M 2300/0014* (2013.01)

(58) Field of Classification Search
CPC ........... H01M 4/10; H01M 4/12; H01M 4/42; H01M 6/085; H01M 4/50; H01M 2300/0014; H01M 2004/021

USPC ......................................................... 429/206
See application file for complete search history.

(56) References Cited

U.S. PATENT DOCUMENTS 6,022,639 A    2/2000   Urry
6,667,133 B1   12/2003  Sumiya et al.
(Continued)

FOREIGN PATENT DOCUMENTS

JP   2002-184396   6/2002
JP   2005-332811   12/2005
(Continued)

OTHER PUBLICATIONS

International Search Report issued in International Patent Application No. PCT/JP2011/002834 dated Jul. 12, 2011.
(Continued)

*Primary Examiner* — Gary Harris
(74) *Attorney, Agent, or Firm* — McDermott Will & Emery LLP

(57) ABSTRACT

An alkaline primary battery includes: a positive electrode 2 containing manganese dioxide; an alkaline electrolyte containing zinc oxide; a gelled negative electrode 3 containing zinc alloy particles, the alkaline electrolyte, and a gelling agent; and a negative electrode current collector 6 inserted in the gelled negative electrode. The gelled negative electrode 3 has a predetermined malleability such that when 4.0 g of the gelled negative electrode 3 formed into a cylindrical shape with a diameter of 15 mm is extended with 200 g of a load through 10 g of a flat plate, and then an upper surface of the extended gelled negative electrode 3 is approximated to a circle, this circle has a diameter ranging from 24 mm to 36 mm, both inclusive.

5 Claims, 9 Drawing Sheets

(51) Int. Cl.
*H01M 4/12* (2006.01)
*H01M 4/42* (2006.01)
*H01M 4/50* (2010.01)
*H01M 6/08* (2006.01)
*H01M 4/02* (2006.01)

(56) References Cited

U.S. PATENT DOCUMENTS

| | | | |
|---|---|---|---|
| 2008/0254364 A1* | 10/2008 | Sumihiro et al. | 429/209 |
| 2009/0053595 A1 | 2/2009 | Izumi et al. | |
| 2009/0169988 A1 | 7/2009 | Kato et al. | |
| 2009/0226815 A1* | 9/2009 | Sumiyama | 429/303 |
| 2010/0099028 A1 | 4/2010 | Sumiyama | |
| 2010/0183916 A1* | 7/2010 | Shimamura et al. | 429/206 |
| 2011/0081579 A1* | 4/2011 | Kato | 429/223 |
| 2012/0094159 A1* | 4/2012 | Okada et al. | 429/94 |

FOREIGN PATENT DOCUMENTS

| | | |
|---|---|---|
| JP | 2006-079901 | 3/2006 |
| JP | 2006-269346 | 10/2006 |
| JP | 2007-157585 | 6/2007 |
| JP | 2007-157585 A | 6/2007 |
| JP | 2009-238374 | 10/2009 |
| JP | 2009-238374 A | 10/2009 |

OTHER PUBLICATIONS

Search Report issued in Chinese Application No. 201180002828.5. No Date listed on NPL.

* cited by examiner

FIG.4

| | GELLING AGENT (POLYACRYLIC ACID) ADDED AMOUNT (wt%) | MASS RATIO OF ZINC ALLOY TO ELECTROLYTE | VISCOSITY OF GELLED NEGATIVE ELECTRODE Pa·S | REVERSE-CONNECTION CHARGING TEST (40Ω) NUMBER OF LEAKAGE OCCURRENCES |
|---|---|---|---|---|
| VERIFICATION1 | 0.90 | 2.00 | 267 | 3/5 |
| VERIFICATION2 | 0.90 | 1.80 | 209 | 4/5 |
| VERIFICATION3 | 0.80 | 2.00 | 197 | 5/5 |
| VERIFICATION4 | 0.80 | 1.80 | 159 | 0/5 |
| VERIFICATION5 | 0.70 | 2.00 | 147 | 5/5 |
| VERIFICATION6 | 0.70 | 1.80 | 117 | 2/5 |
| VERIFICATION7 | 0.60 | 2.00 | 102 | 0/5 |
| VERIFICATION8 | 0.60 | 1.80 | 84 | 2/5 |

FIG.6A

| | ZINC ALLOY PARTICLES | VISCOSITY OF GELLED NEGATIVE ELECTRODE | DIAMETER AFTER EXTENSION | REVERSE-CONNECTION CHARGING TEST (4Ω) | REVERSE-CONNECTION CHARGING TEST (40Ω) |
|---|---|---|---|---|---|
| | SPECIFIC SURFACE AREA (m²/g) | (Pa·s) | (mm) | NUMBER OF LEAKAGE OCCURRENCES | NUMBER OF LEAKAGE OCCURRENCES |
| BATTERY1 | 0.034 | 198.0 | 21.8 | 5/5 | 5/5 |
| BATTERY2 | 0.031 | 192.0 | 24.2 | 3/5 | 0/5 |
| BATTERY3 | 0.028 | 160.0 | 30.2 | 0/5 | 0/5 |
| BATTERY4 | 0.025 | 138.0 | 35.7 | 0/5 | 0/5 |

FIG.6B

| | SHAPE PARAMETER OF ZINC ALLOY PARTICLES | VISCOSITY OF GELLED NEGATIVE ELECTRODE | DIAMETER AFTER EXTENSION | REVERSE-CONNECTION CHARGING TEST (4Ω) | REVERSE-CONNECTION CHARGING TEST (40Ω) |
|---|---|---|---|---|---|
| | | (Pa·s) | (mm) | NUMBER OF LEAKAGE OCCURRENCES | NUMBER OF LEAKAGE OCCURRENCES |
| BATTERY1 | 0.68 | 198.0 | 21.8 | 5/5 | 5/5 |
| BATTERY5 | 0.72 | 192.0 | 23.7 | 5/5 | 3/5 |
| BATTERY6 | 0.76 | 178.0 | 29.3 | 0/5 | 0/5 |
| BATTERY7 | 0.81 | 157.0 | 34.0 | 0/5 | 0/5 |

FIG.7A

| | ORGANIC ANTI-CORROSIVE AGENT | VISCOSITY OF GELLED NEGATIVE ELECTRODE | DIAMETER AFTER EXTENSION | REVERSE-CONNECTION CHARGING TEST (4Ω) | REVERSE-CONNECTION CHARGING TEST (4Ω) |
|---|---|---|---|---|---|
| | ADDED AMOUNT (ppm) | (Pa·s) | (mm) | NUMBER OF LEAKAGE OCCURRENCES | NUMBER OF LEAKAGE OCCURRENCES |
| BATTERY1 | 20.0 | 198.0 | 21.8 | 5/5 | 5/5 |
| BATTERY8 | 40.0 | 160.0 | 23.6 | 5/5 | 5/5 |
| BATTERY9 | 100.0 | 138.0 | 25.6 | 1/5 | 0/5 |
| BATTERY10 | 200.0 | 98.0 | 29.8 | 0/5 | 0/5 |

FIG.7B

| | GELLING AGENT (POLYACRYLIC ACID) | VISCOSITY OF GELLED NEGATIVE ELECTRODE | DIAMETER AFTER EXTENSION | REVERSE-CONNECTION CHARGING TEST (4Ω) | REVERSE-CONNECTION CHARGING TEST (4Ω) |
|---|---|---|---|---|---|
| | ADDED AMOUNT (wt%) | (Pa·s) | (mm) | NUMBER OF LEAKAGE OCCURRENCES | NUMBER OF LEAKAGE OCCURRENCES |
| BATTERY1 | 0.80 | 198.0 | 21.8 | 5/5 | 5/5 |
| BATTERY11 | 0.75 | 173.0 | 22.6 | 5/5 | 4/5 |
| BATTERY12 | 0.70 | 152.0 | 23.2 | 5/5 | 2/5 |
| BATTERY13 | 0.60 | 102.0 | 24.3 | 2/5 | 0/5 |

FIG.7C

| | MASS RATIO OF ZINC ALLOY TO ELECTROLYTE | VISCOSITY OF GELLED NEGATIVE ELECTRODE | DIAMETER AFTER EXTENSION | REVERSE-CONNECTION CHARGING TEST (4Ω) | REVERSE-CONNECTION CHARGING TEST (4Ω) |
|---|---|---|---|---|---|
| | | (Pa·s) | (mm) | NUMBER OF LEAKAGE OCCURRENCES | NUMBER OF LEAKAGE OCCURRENCES |
| BATTERY1 | 2.00 | 198.0 | 21.8 | 5/5 | 5/5 |
| BATTERY14 | 1.90 | 175.0 | 26.1 | 0/5 | 0/5 |
| BATTERY15 | 1.80 | 148.0 | 34.3 | 0/5 | 0/5 |

FIG.8

| | DIAMETER AFTER EXTENSION | REVERSE-CONNECTION CHARGING TEST (4Ω) | REVERSE-CONNECTION CHARGING TEST (40Ω) |
|---|---|---|---|
| | (mm) | NUMBER OF LEAKAGE OCCURRENCES | NUMBER OF LEAKAGE OCCURRENCES |
| BATTERY1 | 21.8 | 5/5 | 5/5 |
| BATTERY11 | 22.6 | 5/5 | 4/5 |
| BATTERY12 | 23.2 | 5/5 | 2/5 |
| BATTERY8 | 23.6 | 5/5 | 5/5 |
| BATTERY5 | 23.7 | 5/5 | 3/5 |
| BATTERY2 | 24.2 | 3/5 | 0/5 |
| BATTERY13 | 24.3 | 2/5 | 0/5 |
| BATTERY9 | 25.6 | 1/5 | 0/5 |
| BATTERY14 | 26.1 | 0/5 | 0/5 |
| BATTERY6 | 29.3 | 0/5 | 0/5 |
| BATTERY10 | 29.8 | 0/5 | 0/5 |
| BATTERY3 | 30.2 | 0/5 | 0/5 |
| BATTERY7 | 34.0 | 0/5 | 0/5 |
| BATTERY15 | 34.3 | 0/5 | 0/5 |
| BATTERY4 | 35.7 | 0/5 | 0/5 |

FIG.9A

| | L1 (mm) | L2 (mm) | L2/L1 | REVERSE-CONNECTION CHARGING TEST (4 Ω) NUMBER OF LEAKAGE OCCURRENCES | REVERSE-CONNECTION CHARGING TEST (40 Ω) NUMBER OF LEAKAGE OCCURRENCES | DISCHARGE PERFORMANCE (INDEX) |
|---|---|---|---|---|---|---|
| BATTERY9 | 42.5 | 27.5 | 0.65 | 4/20 | 0/20 | 100 |
| BATTERY16 | 42.5 | 25.0 | 0.59 | 2/20 | 0/20 | 99 |
| BATTERY17 | 42.5 | 22.5 | 0.53 | 1/20 | 0/20 | 95 |
| BATTERY18 | 42.5 | 20.0 | 0.47 | 0/20 | 0/20 | 93 |
| BATTERY19 | 42.5 | 18.0 | 0.42 | 0/20 | 0/20 | 90 |
| BATTERY20 | 42.5 | 16.0 | 0.38 | 0/20 | 0/20 | 79 |

FIG.9B

| | OUTER DIAMETER OF NEGATIVE ELECTRODE CURRENT COLLECTOR (mm) | REVERSE-CONNECTION CHARGING TEST (4 Ω) NUMBER OF LEAKAGE OCCURRENCES | REVERSE-CONNECTION CHARGING TEST (40 Ω) NUMBER OF LEAKAGE OCCURRENCES | DISCHARGE PERFORMANCE (INDEX) |
|---|---|---|---|---|
| BATTERY9 | 1.40 | 4/20 | 0/20 | 100 |
| BATTERY21 | 1.25 | 2/20 | 0/20 | 100 |
| BATTERY22 | 1.10 | 0/20 | 0/20 | 99 |
| BATTERY23 | 0.95 | 0/20 | 0/20 | 98 |

FIG.10A

| | POTENTIAL OF MANGANESE DIOXIDE (mV) | REVERSE-CONNECTION CHARGING TEST (4 Ω) NUMBER OF LEAKAGE OCCURRENCES | REVERSE-CONNECTION CHARGING TEST (40 Ω) NUMBER OF LEAKAGE OCCURRENCES | DISCHARGE PERFORMANCE (INDEX) |
|---|---|---|---|---|
| BATTERY9 | 275 | 4/20 | 0/20 | 100 |
| BATTERY24 | 286 | 3/20 | 0/20 | 101 |
| BATTERY25 | 297 | 1/20 | 0/20 | 101 |
| BATTERY26 | 304 | 0/20 | 0/20 | 102 |

FIG.10B

| | CONCENTRATION OF ZINC OXIDE (wt%) | REVERSE-CONNECTION CHARGING TEST (4 Ω) NUMBER OF LEAKAGE OCCURRENCES | REVERSE-CONNECTION CHARGING TEST (40 Ω) NUMBER OF LEAKAGE OCCURRENCES | DISCHARGE PERFORMANCE (INDEX) |
|---|---|---|---|---|
| BATTERY9 | 1.7 | 4/20 | 0/20 | 100 |
| BATTERY27 | 2.1 | 1/20 | 0/20 | 99 |
| BATTERY28 | 2.6 | 0/20 | 0/20 | 99 |
| BATTERY29 | 3.0 | 0/20 | 0/20 | 94 |
| BATTERY30 | 3.4 | 0/20 | 0/20 | 87 |

FIG.10C

| | AMOUNT OF ADDED BISMUTH (wtppm) | REVERSE-CONNECTION CHARGING TEST (4 Ω) NUMBER OF LEAKAGE OCCURRENCES | REVERSE-CONNECTION CHARGING TEST (40 Ω) NUMBER OF LEAKAGE OCCURRENCES | DISCHARGE PERFORMANCE (INDEX) |
|---|---|---|---|---|
| BATTERY9 | 80 | 4/20 | 0/20 | 100 |
| BATTERY31 | 150 | 1/20 | 0/20 | 98 |
| BATTERY32 | 250 | 0/20 | 0/20 | 94 |
| BATTERY33 | 350 | 0/20 | 0/20 | 85 |

ALKALINE PRIMARY BATTERY

RELATED APPLICATIONS

This application is the U.S. National Phase under 35 U.S.C. §371 of International Application No. PCT/JP2011/002834, filed on May 20, 2011, which in turn claims the benefit of Japanese Application No. 2010-227647, filed on Oct. 7, 2010, the disclosures of which Applications are incorporated by reference herein.

TECHNICAL FIELD

The present disclosure relates to alkaline primary batteries (hereinafter also referred to as "batteries").

BACKGROUND ART

Alkaline primary batteries are highly versatile and can be manufactured at low cost, and therefore, are widely used as power sources for various types of equipment. The alkaline primary batteries are required to have further enhanced performance.

For example, PATENT DOCUMENT 1 describes that the use of a polymer, as a thickener, obtained by polymerization using a cross-linking agent which dissolves in an alkaline atmosphere allows discharge characteristics of an alkaline battery to be maintained for a long term, and enables a battery case to be filled with an alkaline electrolyte with a uniform loading weight.

PATENT DOCUMENT 2 shows that a negative electrode gel layer made of a high-viscosity gel layer and a low-viscosity gel layer can enhance shock resistance of an alkaline battery, while maintaining discharge performance thereof.

CITATION LIST

Patent Document

[PATENT DOCUMENT 1] Japanese Patent Publication No. 2006-079901
[PATENT DOCUMENT 2] Japanese Patent Publication No. 2006-269346

SUMMARY OF THE INVENTION

Technical Problem

When an alkaline primary battery is reversely connected (where reverse connection is to reversely connect an positive electrode and a negative electrode of the alkaline primary battery), an alkaline electrolyte leaks out from the reversely connected battery. This leakage due to reverse connection (hereinafter also referred to as "leakage") needs to be reduced.

It is therefore an object of the present disclosure to reduce leakage due to reverse connection.

Solution to the Problem

An alkaline primary battery in an aspect of the present disclosure includes: a positive electrode containing manganese dioxide; an alkaline electrolyte (hereinafter also referred to as an electrolyte) containing zinc oxide; a gelled negative electrode containing zinc alloy particles, the alkaline electrolyte, and a gelling agent; and a negative electrode current collector inserted in the gelled negative electrode. The gelled negative electrode of the present disclosure has a high malleability. The malleability herein is a property indicating the degree of ability of being extended. The gelled negative electrode of the present disclosure is highly malleable.

When such an alkaline primary battery is reversely connected, the gelled negative electrode is extended under a pressure of a hydrogen gas generated from the surface of the negative electrode current collector. Accordingly, the hydrogen gas can remain on the surface of the negative electrode current collector. That is, a gas layer of a hydrogen gas is formed on the surface of the negative electrode current collector. In this manner, the gelled negative electrode and the negative electrode current collector are electrically insulated from each other, and thus, a charge current (i.e., a current flowing in the reversely connected alkaline primary battery) decreases or becomes zero. Consequently, generation reaction of the hydrogen gas can be reduced, resulting in that an increase in a battery internal pressure can be reduced.

Advantages of the Invention

According to the present disclosure, leakage due to reverse connection can be reduced.

BRIEF DESCRIPTION OF THE DRAWINGS

FIG. 4 is a table showing results on the viscosity of a gelled negative electrode and presence of leakage.

FIGS. 6(a) and 6(b) are tables showing a summary of results on examples.

FIGS. 7(a)-7(c) are tables showing a summary of results on examples.

FIG. 8 is a table showing a summary of results on examples.

FIGS. 9(a) and 9(b) are tables showing a summary of results on examples.

FIGS. 10(a)-10(c) are tables showing a summary of results on examples.

DESCRIPTION OF EMBODIMENTS

An embodiment of the present disclosure will be described in detail hereinafter with reference to the drawings. The present disclosure is not limited to the following embodiment.

Figure 1:
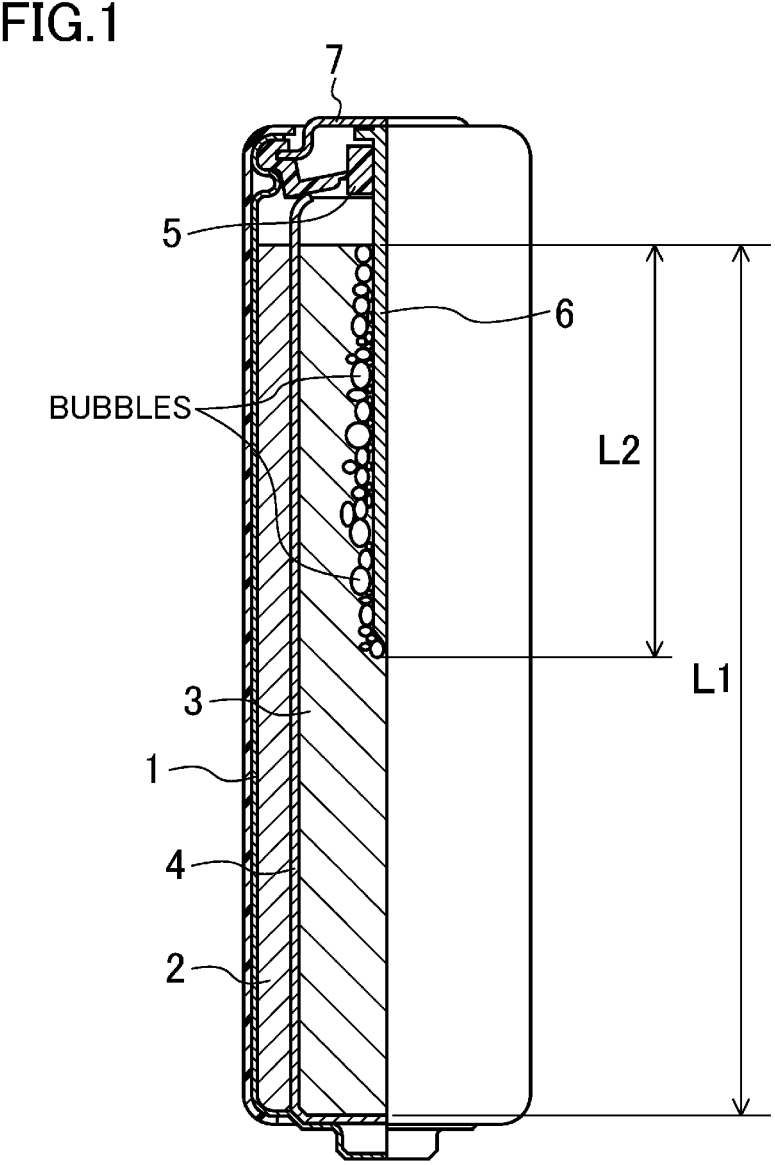
FIG. 1 is a half-sectional view illustrating an alkaline primary battery according to an embodiment of the present disclosure.

FIG. 1 is a half-sectional view illustrating an alkaline primary battery according to an embodiment of the present disclosure.

In the alkaline primary battery of this embodiment, a bottomed battery case (also serving as a positive electrode terminal) 1 is hermetically sealed by a sealing member. The battery case 1 is pressed into a predetermined shape with predetermined dimensions by a known method using a nickel-plated steel plate, for example. In the battery case 1, a positive electrode 2, a separator 4, and a gelled negative electrode 3 are provided in this order from the outside to the inside along a radius of the battery case 1. The positive electrode 2 is cylindrical, and contains a positive electrode active material including, for example, manganese dioxide powder, a conductive agent such as graphite, and an alkaline electrolyte, for example. The alkaline electrolyte contains 30 to 40 mass percent (mass %) of potassium hydroxide and a predetermined amount of zinc oxide. The separator 4 is a nonwoven fabric in which polyvinyl alcohol fiber and rayon fiber are mixed, for example, and holds an alkaline electrolyte. The gelled negative electrode 3 contains a negative electrode active material such as zinc alloy powder, a gelling agent such as polyacrylic acid or polyacrylic acid Na, and an alkaline electrolyte. The zinc alloy powder preferably does not contain mercury, cadmium, lead, or any of these elements for environmental reasons, and only needs to contain at least one of bismuth, indium, or aluminum.

The sealing member includes a gasket 5, a negative electrode current collector 6, and a negative electrode terminal plate 7. The gasket 5 is formed by injection-molding a resin such as polyamide or polypropylene into a predetermined shape with predetermined dimensions. The negative electrode current collector 6 is formed by pressing a wire material such as copper or brass into a predetermined shape (e.g., a nail shape) with predetermined dimensions, for example, and is inserted into the gelled negative electrode 3 through the gasket 5. The negative electrode terminal plate 7 is formed by pressing a nickel-plated steel plate into a predetermined shape with predetermined dimensions, for example, and is crimped to an opening edge of the battery case 1 with the gasket 5 interposed therebetween to be electrically connected to the negative electrode current collector 6.

It is known that reverse connection of an alkaline primary battery causes leakage. The inventors intensively studied for a solution to this problem, and found that a hydrogen gas remaining on the surface of the negative electrode current collector 6 (see FIG. 1) can reduce leakage. The study of the inventors will be described hereinafter prior to description of an alkaline primary battery according to an embodiment.

Figure 2:
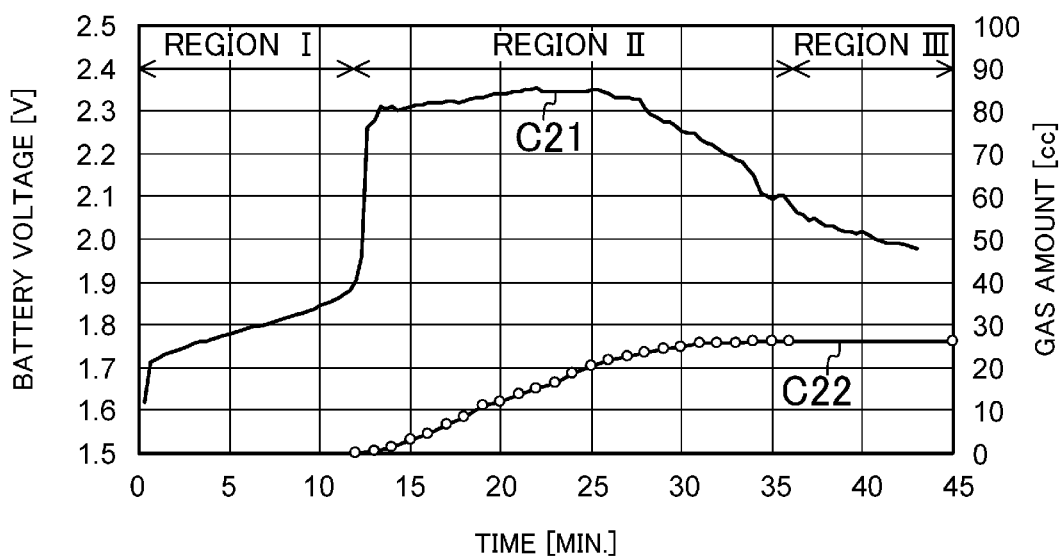
FIG. 2 is a graph showing analysis results on the battery voltage and the amount of gas generation in reverse connection.

A mechanism of leakage due to reverse connection is proposed as follows. FIG. 2 is a graph showing analysis results on the battery voltage and the amount of gas generation in reverse connection. Reference characters C21 and C22 in FIG. 2 indicate changes in the battery voltage and the amount of gas generation, respectively. It is assumed that the following reactions occur in regions I-III.

Region I

Positive electrode: $MnO_{2-x}+2xOH^- \rightarrow MnO_2+xH_2O+2xe^-$  (reaction (1))

Negative electrode: $ZnO+H_2O+2e^- \rightarrow Zn+2OH^-$  (reaction (2))

When reaction (2) finishes in the negative electrode, the battery voltage rapidly increases. Accordingly, in the negative electrode, the following reaction (3) predominantly occurs.

Region II

Positive electrode: $MnO_{2-x}+2xOH^- \rightarrow MnO_2+xH_2O+2xe^-$  (reaction (1))

Negative electrode: $2H_2O+2e^- \rightarrow H_2+2OH^-$  (reaction (3))

After a predetermined period, the battery voltage starts decreasing, and reaction (3) and reaction (6) described below competitively occur at the negative electrode. When a sufficient amount of zinc oxide is generated in reaction (5), reaction (6) predominantly occurs.

Region III

Positive electrode: $4OH^- \rightarrow 2H_2O+O_2+4e^-$  (reaction (4))

Negative electrode: $Zn+(½)O_2 \rightarrow ZnO$  (reaction (5))

$ZnO+H_2O+2e^- \rightarrow Zn+2OH^-$  (reaction (6))

Regarding the amount of gas generation (indicated by C22 in FIG. 2), no gas is generated in region I. In region II, since a hydrogen gas is generated at the negative electrode, the amount of gas generation increases. In region III, an oxygen gas is generated at the positive electrode, but this oxygen gas is consumed at the negative electrode. Accordingly, an increase in the amount of gas generation is reduced. In this manner, since the amount of gas generation increases in region II, the internal pressure of the alkaline primary battery rises. When this internal pressure exceeds a predetermined value, the gasket is broken, resulting in leakage.

In searching for a solution to the above-described problem by intentionally reversely connecting an alkaline primary battery, the inventors found that no leakage occurs in some cases despite the reverse connection. As a reason for this case, the inventors hypothesized as follows.

It is predicted that a quick change from region II to region III (i.e., a quick shift from reaction (3) to reaction (6) in the negative electrode) in the mechanism described above can reduce an increase in the amount of gas generation and, thereby, reduce leakage. Zinc oxide is necessary for reaction (6) to predominantly occur relative to reaction (3). However, when the amount of charge current is small, a small amount of zinc oxide can be enough to cause reaction (6). Based on this phenomenon, the inventors hypothesized that the reason why no leakage occurs despite reverse connection is that the amount of charge current is small or 0 (zero).

Figure 3:
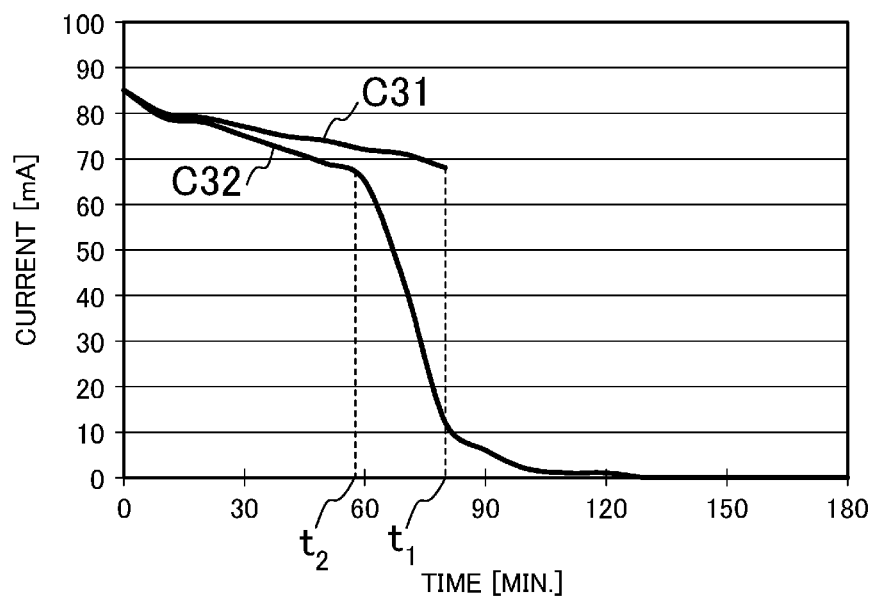
FIG. 3 is a graph showing a change in charge current with time in reverse connection.

To confirm this hypothesis, an alkaline primary battery was reversely connected, and a charge current thereof was measured. Specifically, four alkaline primary batteries were connected in series, and one of the alkaline primary batteries was reversely connected. Then, these four alkaline primary batteries were discharged with a discharge load of 40Ω. FIG. 3 shows the results of measurement. In the graph of FIG. 3, C31 indicates a change with time in charge current of an alkaline primary battery showing leakage, and C32 indicates a change with time in charge current of an alkaline primary battery showing no leakage.

In the alkaline primary battery showing leakage, a charge current gradually decreases with time, and comes to leak.

On the other hand, in the alkaline primary battery showing on leakage, a charge current gradually decreased with time, and the amount of the decrease was slightly larger than the amount of the decrease in the alkaline primary battery showing leakage. In addition, the charge current started decreasing rapidly at time t2, and then slowly decreased to eventually reach 0 (zero) (mA).

This results confirmed the hypothesis that the reason why no leakage occurs despite reverse connection is that the charge current is small or 0 (zero). In view of this, it can be predicted that a design of an alkaline primary battery for obtaining a small charge current achieves manufacturing of alkaline primary batteries showing reduced leakage. However, if this design degrades characteristics (e.g., discharge characteristics) in normal discharge, problems such as limited application of alkaline primary batteries can arise. For this reason, it is preferable to design an alkaline primary battery so as to allow the internal resistance of the alkaline primary battery to increase only in reverse connection.

In view of this demand, the inventors focused on a rapid decrease in charge current shortly after reverse connection in a battery showing no leakage (see FIG. 3). The inventors came to have an idea that if a generated hydrogen gas remains on the surface of the negative electrode current collector, the behaviors indicated by C32 in FIG. 3 can be explained and the above-described demand is satisfied.

When a hydrogen gas is generated on the surface of the negative electrode current collector, the gelled negative electrode is subjected to a pressure of the hydrogen gas. If the gelled negative electrode is hardly deformed even under this pressure, the hydrogen gas cannot remain on the surface of the negative electrode current collector, and accordingly, escapes from space on the surface of the negative electrode current collector into the battery case through the gelled negative electrode. On the other hand, if the gelled negative electrode is easily deformed under the pressure, space in which the hydrogen gas exists can be kept on the surface of the negative electrode current collector, resulting in that the hydrogen gas does not escape into the battery case and remains on the surface of the negative electrode current collector.

Based on the foregoing idea, the inventors predicted that if the deformability of the gelled negative electrode is optimized, the hydrogen gas easily remains on the surface of the negative electrode current collector, and tried to optimize the viscosity of the gelled negative electrode.

Specifically, 8 types of gelled negative electrodes were formed with the amount of an added gelling agent (polyacrylic acid) or the mass ratio of a zinc alloy to an alkaline electrolyte varied. Thereafter, the viscosities of the obtained gelled negative electrodes were measured with a TVB-10H viscometer produced by TOM SANGYO CO., LTD. In this measurement, the viscosities were measured at 20° C. with a rotor of H6 at a rotor rotation speed of 2.5 rpm. Then, using the gelled negative electrodes, alkaline primary batteries were fabricated, and were subjected to a reverse-connection charging test. In the reverse-connection charging test, four alkaline primary batteries were connected in series with one of the batteries reversely connected, and discharged with a predetermined discharge load (which was 40Ω at this time as shown in FIG. 4), and the presence of leakage was observed after a lapse of 24 hours from the end of discharging. The results of this test are shown in FIG. 4.

As shown in FIG. 4, leakage occurred in some cases even with a low viscosity of the gelled negative electrode (verification 8), and no leakage occurred in some cases even with a high viscosity of the gelled negative electrode (verification 4). This result shows that it is difficult to prevent leakage by optimizing the viscosity of the gelled negative electrode.

The results in FIG. 4 also show that the range of the optimized viscosity of the gelled negative electrode is small. For example, when the viscosity of the gelled negative electrode was 159 Pa·S, no leakage occurred (verification 4), whereas when the viscosity of the gelled negative electrode decreased only by about 7% from 159 Pa·S, leakage occurred (verification 5). Therefore, a solution for preventing leakage by adjusting the viscosity of the gelled negative electrode is not suitable for manufacturing alkaline primary batteries.

As described above, it was found that leakage cannot be prevented by optimizing the viscosity of the gelled negative electrode. The inventors thought this is because of the following reasons. The viscosity is a physical value depending on a shearing stress. On the other hand, in reverse connection, a pressure of a hydrogen gas is applied to the gelled negative electrode in the outward direction (one direction) along a radius of the battery case. In view of this, it is considered to be difficult to prevent leakage by optimizing the viscosity of the gelled negative electrode. That is, the results shown in FIG. 4 are appropriate.

The property of malleability is known as a property indicating easiness of deformation when receiving a pressure in one direction. The inventors examined reduction of leakage by increasing malleability of the gelled negative electrode 3 (i.e., allowing the gelled negative electrode 3 to be easily extended).

The inventors came to have an idea of reducing friction among zinc alloy particles in order to increase malleability of the gelled negative electrode 3. Based on this idea, the inventors conducted the following experiment.

First, zinc alloys (of 4 types) having different specific surface areas were prepared with a known method, and malleabilities of gelled negative electrodes 3 were measured with a method (see FIG. 5) which will be described later. Using these gelled negative electrodes 3, alkaline primary batteries (batteries 1-4) were fabricated, and were subjected to a reverse-connection charging test. The results are shown in FIG. 6(a). Among the batteries 1-4, only specific surface areas of zinc alloys are different.

Figure 5:
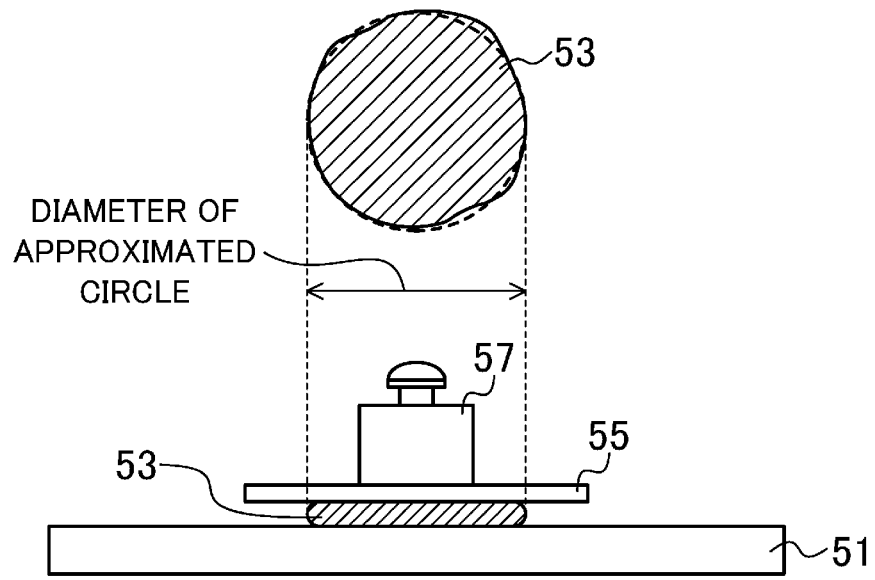
FIG. 5 is a view showing a method for measuring malleability of a gelled negative electrode.

FIG. 5 is a view showing a method for measuring malleability of the gelled negative electrode 3. First, an alkaline primary battery was disassembled, and a gelled negative electrode 3 was taken out. Then, 4.0 g of the gelled negative electrode 3 was placed on a base 51 of an acrylic resin, and this gelled negative electrode 53 is formed into a cylindrical shape with a diameter of 15 mm. Here, the diameter of the shape of the gelled negative electrode 53 is not limited to 15 mm, and may be in the range of 15 mm±10%, for example. The "cylindrical shape" is not limited to a cylinder which is a complete circle in cross section, and may be any shape as long as the diameter thereof can be calculated when the outer shape of the upper surface is approximated to be a circle using, for example, an optical microscope which will be described later.

Next, a weight (200 g) 57 was placed on the gelled negative electrode 53 with a flat plate (10 g) 55 of an acrylic resin interposed therebetween, thereby causing the gelled negative electrode 53 to extend. Within about one minute after placing the weight 57, visible extension of the gelled negative electrode 53 is finished. Then, the gelled negative electrode 53 continues to extend, and after a lapse of about 5 minutes from the placement of the weight 57, no substantial change (substantial extension) of the gelled negative electrode 53 was observed. After the substantial change of the gelled negative electrode 53 disappears, i.e., after a lapse of about 5 minutes from the placement of the weight 57, the weight 57 and the flat plate 55 were removed, and the x coordinates and the y coordinates of arbitrary-selected five points on the outer periphery of the gelled negative electrode 53 are measured with an optical microscope (not shown). Using the measured x and y coordinates of the five points, the outer shape of the upper surface of the gelled negative electrode 53 is approximated to be a circle, and the diameter of the gelled negative electrode 53 was obtained. As the measured diameter (i.e., the diameter of the extended gelled negative electrode 3, hereinafter referred to as the diameter after extension) increases, the malleability of the gelled negative electrode 53 is considered to increase.

The results shown in FIG. 6(a) will be considered. As shown in FIG. 6(a), as the specific surface area of zinc alloy particles decreased, the malleability of the gelled negative electrode 3 increased (i.e., the "diameter after extension" shown in FIG. 6(a) increased. As expected by the inventors, this is considered to be because of the following reasons. If the shapes (i.e., outer shapes) of zinc alloy particles are substantially identical, the diameter of the zinc alloy particles increases as the specific surface area of the zinc alloy particles decreases. As the diameter of the zinc alloy particles increases, the number of contacts among the zinc alloy particles decreases in the gelled negative electrode 3, and thus, friction among the zinc alloy particles decreases. Accordingly, as the specific surface area of the zinc alloy particles decreases, the gelled negative electrode 3 more easily extends.

As shown in FIG. 6(a), as the malleability of the gelled negative electrode 3 increased, the degree of reduction of leakage increased. The reasons of this were expected by the inventors as follows. When malleability of the gelled negative electrode 3 increases, the gelled negative electrode 3 is subjected to a pressure of a hydrogen gas, and easily extends.

Accordingly, the hydrogen gas easily exists on the surface of the negative electrode current collector 6. Accordingly, the contact between the gelled negative electrode 3 and the negative electrode current collector 6 becomes difficult, and the gelled negative electrode 3 and the negative electrode current collector 6 are electrically insulated from each other. In this manner, in the alkaline primary battery of this embodiment, the negative electrode current collector 6 and the gelled negative electrode 3 are electrically insulated from each other in reverse connection, and thus, a charge current does not easily flow or a charge current becomes 0 (zero). Then, generation (reaction (3)) of the hydrogen gas is reduced, thereby reducing an increase in the internal pressure of the battery. As a result, leakage can be reduced.

The results shown in FIG. 6(*a*) will be specifically considered. If the specific surface area of zinc alloy particles is 0.031 $m^2/g$ or less, leakage can be reduced in a reverse-connection charging test (i.e., a charging test under a small current) where the discharge load is 40Ω. Then, leakage of an alkaline primary battery incorporated in equipment such as a remote controller can be reduced, for example. If the specific surface area of the zinc alloy particles is 0.028 $m^2/g$ or less, leakage can be reduced in a reverse-connection charging test (i.e., a charging test under a large current) where the discharge load is 4Ω. Then, leakage of an alkaline primary battery incorporated in equipment such as a flashlight can be reduced, for example. However, if the specific surface area of zinc alloy particles is less than 0.025 $m^2/g$, reactivity of the zinc alloy particles decreases, and a problem of degradation of discharge characteristics might arise. For the reasons described above, the specific surface area of the zinc alloy particles is preferably in the range from 0.025 $m^2/g$ to 0.031 $m^2/g$, both inclusive, and more preferably in the range from 0.025 $m^2/g$ to 0.028 $m^2/g$, both inclusive.

Based on the results shown in FIG. 6(*a*) and the consideration on the results, the inventors predicted that the outer shape of zinc alloy particles approximated to spheres can obtain results similar to the results shown in FIG. 6(*a*), and conducted the following experiment.

Gelled negative electrodes 3 having different outer shapes of zinc alloy particles were fabricated with atomize conditions (e.g., an atomizing pressure, the oxygen content of an atomized gas, the temperature of the atomized gas, and the outer shape of an atomizing nozzle) changed. With the method shown in FIG. 5, malleability of this gelled negative electrode 3 was measured, and then batteries 5-7 shown in FIG. 6(*b*) were fabricated using the gelled negative electrode 3. That is, the batteries 5-7 differ from the battery 1 only in the outer shapes of zinc alloy particles. A reverse-connection charging test was performed on the fabricated batteries to observe the presence of leakage. The results are shown in FIG. 6(*b*).

Here, the "shape parameter" in FIG. 6(*b*) is the ratio of (actual peripheral length of zinc alloy particles)/(peripheral length of a circle which zinc alloy particles circumscribe). As the shape parameter increases, the outer shapes of zinc alloy particles approach spheres. As the shape parameter decreases, the outer shapes of zinc alloy particles become away from spheres (i.e., distortion occurs). Such a shape parameter was obtained by arbitrary selecting 10 zinc alloy particles, measuring the above-mentioned two physical values of these zinc alloy particles with a scanning electron microscope (SEM), and substituting the obtained values into the equation described above.

As shown in FIG. 6 (*b*), as the shape parameter of the zinc alloy particles increased, the malleability of the gelled negative electrode 3 increased. As expected by the inventors, this is considered to be because of the following reasons. As the shape parameter of zinc alloy particles increases, the outer shapes of the zinc alloy particles approach spheres. Accordingly, the number of contacts among the zinc alloy particles in the gelled negative electrode 3 decreases, friction among the zinc alloy particles decreases. Consequently, as the shape parameter of the zinc alloy particles increases, the gelled negative electrode 3 more easily extends.

In addition, as shown in FIG. 6 (*b*), as the malleability of the gelled negative electrode 3 increased, the degree of reduction of leakage increased. This is because of the reasons described for the results shown in FIG. 6(*a*).

The results shown in FIG. 6 (*b*) will be specifically considered. When the shape parameter of zinc alloy particles was 0.72 or more, leakage was slightly reduced in a charging test under a small current. If the shape parameter of zinc alloy particles was 0.76 or more, leakage was also reduced in a charging test under a large current. However, when the shape parameter of zinc alloy particles exceeded 0.81, it was difficult to form zinc alloy particles in some cases. Accordingly, the shape parameter of zinc alloy particles is preferably in the range from 0.72 to 0.81, both inclusive, and more preferably in the range from 0.76 to 0.81, both inclusive.

FIG. 6 (*b*) shows the results in a case where the specific surface area of zinc alloy particles is 0.034 $m^2/g$. Accordingly, it is considered that when the specific surface area of zinc alloy particles decreases below 0.034 $m^2/g$, the value in the "diameter after extension" in FIG. 6 (*b*) increases. In practice, in the battery 2 shown in FIG. 6(*a*), the shape parameter of zinc alloy particles is 0.68 as in the battery 1. However, since the specific surface area of zinc alloy particles in the battery 2 is smaller than that of the battery 1, leakage is reduced in a charging test under a small current. In view of this, it can be concluded that when the specific surface area of zinc alloy particles is less than 0.034 $m^2/g$, the shape parameter of zinc alloy particles does not need to be 0.72 or more, and may be about 0.68.

Likewise, FIG. 6(*a*) shows the results in a case where the shape parameter of zinc alloy particles is 0.68. Accordingly, it is considered that when the shape parameter of zinc alloy particles exceeds 0.68, the value in the "diameter after extension" in FIG. 6(*a*) increases. In practice, in the battery 5 shown in FIG. 6 (*b*), the specific surface area of zinc alloy particles is 0.034 $m^2/g$ as in the battery 1. However, since the shape parameter of zinc alloy particles in the battery 5 is larger than that of the battery 1, leakage is reduced in a charging test under a small current. In view of this, it can be concluded that when the shape parameter of zinc alloy particles is larger than 0.68, the specific surface area of zinc alloy particles does not need to be 0.031 $m^2/g$ or less, and may be about 0.034 $m^2/g$.

The battery 2 and the battery 5 have the same viscosity value of the gelled negative electrode 3, and differ in malleability of the gelled negative electrode 3. Accordingly, the battery 2 and the battery 5 show different results on the reverse-connection charging test. This result also shows that leakage cannot be reduced by optimizing the viscosity of the gelled negative electrode 3.

Further, the inventors studied how malleability of the gelled negative electrode 3 are affected by the amount of an organic anti-corrosive agent to an electrolyte (hereinafter referred to as the "amount of the added organic anti-corrosive agent"), the amount of a gelling agent (polyacrylic acid) to the electrolyte (hereinafter referred to as the "amount of added polyacrylic acid"), and the mass ratio of a zinc alloy to the electrolyte. Specifically, the gelled negative electrode 3 was formed with a change of only the amount of the added organic anti-corrosive agent, and malleability of this gelled negative electrode 3 was examined with the method shown in FIG. 5. Using the gelled negative electrode 3, batteries 8-10 illustrated in FIG. 7(a) were fabricated. That is, the batteries 8-10 differ from the battery 1 only in the amount of the added organic anti-corrosive agent. The batteries were subjected to a reverse-connection charging test, and the presence of leakage was observed. The same experiment was conducted with respect to the amount of added polyacrylic acid and the mass ratio of the zinc alloy to the electrolyte. That is, batteries 11-13 differ from the battery 1 only in the amount of added polyacrylic acid, and batteries 14 and 15 differ from the battery 1 only in the mass ratio describe above. The obtained results are shown in FIG. 7(a)-7(c).

As shown in FIG. 7(a), even when the amount of the added organic anti-corrosive agent was greatly increased, malleability of the gelled negative electrode 3 only slightly increased. If the amount of the added organic anti-corrosive agent is about 10 times as large as that in the battery 1, leakage can be prevented (battery 10). However, if the amount of the added organic anti-corrosive agent is not large, the organic anti-corrosive agent is adsorbed on the surfaces of zinc alloy particles to inhibit reactivity of the zinc alloy particles, resulting in that discharge characteristics might degrade. For this reason, the inventors concluded that it is difficult to increase malleability of the gelled negative electrode 3 only by increasing the amount of the added organic anti-corrosive agent.

As shown in FIG. 7(b), even when the amount of added polyacrylic acid was reduced, malleability of the gelled negative electrode 3 did not increased so much, and leakage occurred. It is expected that if the amount of added polyacrylic acid is reduced to the amount smaller than that in the battery 13, malleability of the gelled negative electrode 3 will increase. However, if the amount of added polyacrylic acid is reduced below 0.60 mass %, gelling of the zinc alloy particles becomes difficult, resulting in that discharge characteristics might degrade. For this reason, the inventors concluded that it is difficult to increase malleability of the gelled negative electrode 3 only by reducing the amount of added polyacrylic acid.

On the other hand, as shown in FIG. 7(c), when the mass ratio of the zinc alloy to the electrolyte was reduced, the gelled negative electrode 3 had a high malleability, and leakage was prevented. This mass ratio is conventionally considered to contribute to viscosity of a gelled negative electrode, but is now found to also significantly contribute to malleability of the gelled negative electrode 3. This is considered to be because of the following reasons. When this mass ratio decreases, the ratio of the zinc alloy particles to the electrolyte decreases, and thus, the proportion of the electrolyte among the zinc alloy particles increases. Accordingly, friction among the zinc alloy particles decreases, resulting in an increase in malleability of the gelled negative electrode 3.

Specifically, the mass ratio of the zinc alloy to the electrolyte only needs to be 1.9 or less. If this mass ratio is lower than 1.8, the content of the zinc alloy decreases, resulting in that the capacity might decrease. For this reason, the mass ratio is preferably in the range from 1.8 to 1.9, both inclusive.

FIG. 7(c) shows results in a case where the specific surface area of the zinc alloy particles is 0.034 m$^2$/g. Based on the results, it can be considered that if the specific surface area of the zinc alloy particles decreases below 0.034 m$^2$/g, the value of the "diameter after extension" in FIG. 7(c) increases. In practice, in the battery 2 shown in FIG. 6(a), although the mass ratio of the zinc alloy to the electrolyte is 2.0 as in the battery 1, the specific surface area of the zinc alloy particles is smaller than that in the battery 1, resulting in that leakage is reduced in a charging test under a small current. In view of these results, when the specific surface area of the zinc alloy particles is less than 0.034 m$^2$/g, the mass ratio does not need to be 1.9 or less, and may be about 2.0.

Similarly, FIG. 7(c) shows results in a case where the shape parameter of the zinc alloy particles is 0.68. Based on the results, it can be considered that if the shape parameter of the zinc alloy particles exceeds 0.68, the value in the "diameter after extension" in FIG. 7(c) increases. In practice, in the battery 5 shown in FIG. 6(b), although the mass ratio of the zinc alloy to the electrolyte is 2.0 as in the battery 1, the shape parameter of the zinc alloy particles is larger than that in the battery 1, resulting in that leakage is reduced in a charging test under a small current. In view of these results, when the shape parameter of the zinc alloy particles is larger than 0.68, the mass ratio does not need to be 1.9 or less, and may be about 2.0.

Further, in the battery 14 shown in FIG. 7(c), although the specific surface area and the shape parameter of the zinc alloy particles are 0.034 m$^2$/g and 0.68, respectively, as in the battery 1, the mass ratio of the zinc alloy to the electrolyte is lower than that in the battery 1, resulting in that leakage is reduced in the charging test under a small current. In view of these results, when the mass ratio is 1.9 or less, the specific surface area of the zinc alloy particles does not need to be 0.031 m$^2$/g or less and may be about 0.034 m$^2$/g, and the shape parameter of the zinc alloy particles does not need to be 0.72 or more and may be about 0.68.

Although not specifically described, in the battery 14 shown in FIG. 7(c), for example, it is expected that if the specific surface area of the zinc alloy particles is 0.031 m$^2$/g or less and the shape parameter of the zinc alloy particles is 0.72 or more, the diameter after extension exceeds 26.1 mm. That is, if at least one of the specific surface area of the zinc alloy particles, the shape parameter of the zinc alloy particles, or the mass ratio of the zinc alloy to the electrolyte, for example, is optimized, friction among the zinc alloy particles is reduced, and thus, malleability of the gelled negative electrode 3 can be enhanced, thus reducing leakage. The specific surface area and the shape parameter of the zinc alloy particles are determined depending on production equipment for the zinc alloy particles, for example, in some cases. The mass ratio is determined depending on a desired battery capacity, for example, in some cases. Further, whether reduction of leakage in a charging test under a small current is sufficient or reduction of leakage in a charging test under a large current as well as in a charging test under a small current is required depends on the purpose of an alkaline primary battery, for example. Based on these circumstances and the experimental results described above, at least one of the specific surface area of the zinc alloy particles, the shape parameter of the zinc alloy particles, or the mass ratio, for example, is appropriately selected.

On the other hand, it is difficult to prevent leakage only by optimizing the amount of the added organic anti-corrosive agent or the amount of added polyacrylic acid. However, it is apparent that if the amount of the added organic anti-corrosive agent is increased or the amount of added polyacrylic acid is reduced, malleability of the gelled negative electrode 3 is increased. Accordingly, it is expected that if the amount of the added organic anti-corrosive agent is increased or the amount of added polyacrylic acid is reduced in the batteries 2-7, 14, and 15, the gelled negative electrode 3 is more easily extended, and thus, leakage can be further reduced. Increase in the amount of the added organic anti-corrosive agent or reduction in the amount of added polyacrylic acid is appropriately selected so as to obtain a desired malleability of the gelled negative electrode 3.

FIG. 8 shows a summary of the results shown in FIG. 6(*a*)-7(*c*). As shown in FIG. 8, if the diameter of the extended gelled negative electrode 3 is 24 mm or more, leakage in charging under a small current can be prevented. If the diameter of the extended gelled negative electrode 3 is 26 mm or more, leakage in charging under a large current can be prevented.

As malleability of the gelled negative electrode 3 increases, a hydrogen gas more easily remains on the surface of the negative electrode current collector 6. However, if malleability of the gelled negative electrode 3 is excessively high, the extended gelled negative electrode 3 passes over the separator 4 to come into contact with the positive electrode 2, resulting in that an internal short-circuit might occur. Although not specifically described, the inventors confirmed that when the diameter of the extended gelled negative electrode 3 exceeds 36 mm, an internal short-circuit occurs in some cases. In view of this, the diameter of the extended gelled negative electrode 3 is preferably in the range from 24 mm to 36 mm, both inclusive, and more preferably in the range from 26 mm to 36 mm, both inclusive. Considering that the diameter of the gelled negative electrode 3 before extension is about 15 mm, the extension ratio (i.e., the ratio of the diameter of the extended gelled negative electrode 3/the diameter of the gelled negative electrode 3 before extension) is in the range from 1.5 to 2.4, both inclusive, and preferably in the range from 1.6 to 2.4, both inclusive.

The inventors further conducted examinations, and studied a structure of an alkaline primary battery capable of further reducing leakage. First, the inventors focused on estimation (i.e., leakage can be reduced when the gelled negative electrode 3 and the negative electrode current collector 6 are hardly in contact with each other in reverse connection) obtained from the experimental results, and expected that if the length of the negative electrode current collector 6 (i.e., the insertion length of the negative electrode current collector 6) inserted in the gelled negative electrode 3 is reduced or if the maximum diameter (i.e., the outer diameter of the negative electrode current collector 6) of a part of the negative electrode current collector 6 inserted in the gelled negative electrode 3 is reduced, the contact area between the gelled negative electrode 3 and the negative electrode current collector 6 decreases, and thereby, the contact resistance between the gelled negative electrode 3 and the negative electrode current collector 6 increases. In many of commercially available alkaline primary batteries, to obtain a current collection efficiency by the negative electrode current collector 6 and prevent a capacity decrease, the ratio of the insertion length L2 of the negative electrode current collector 6 to the height L1 of the gelled negative electrode 3 (i.e., the filling height of the gelled negative electrode 3) (L2/L1) in the battery case 1 is about 0.65, and the outer diameter of the negative electrode current collector 6 is 1.3 mm to 1.5 mm. In view of this, experiments of optimizing the ratio L2/L1 and the outer diameter of the negative electrode current collector 6 were carried out.

Specifically, batteries (i.e., batteries 16-20 shown in FIG. 9(*a*)) different from the battery 9 only in L2/L1 and batteries (i.e., batteries 21-23 shown in FIG. 9(*b*)) different from the battery 9 only in the outer diameter of the negative electrode current collector 6 were fabricated. Then, these batteries were subjected to reverse-connection charging tests (where the discharge load was 4Ω and 40Ω, respectively) and a discharge performance test. In the discharge performance test, a constant current (1000 mA) is caused to flow in a single alkaline primary battery, and the alkaline primary battery is discharged such that the time (duration time) until the voltage of the alkaline primary battery reaches an end voltage (0.9V) was measured. Then, the ratio of the duration time of each battery to the duration time of the battery 9 (i.e., "discharge performance" shown in FIG. 9(*a*), for example) was calculated. FIG. 9(*a*) shows the results on L2/L1, and FIG. 9(*b*) shows the results on the outer diameter of the negative electrode current collector 6.

As shown in FIG. 9(*a*), leakage becomes less likely to occur as L2/L1 decreases, as expected by the inventors. On the other hand, as L2/L1 decreases, the discharge performance degrades. When L2/L1 was 0.42, the discharge performance degraded by about 10%. When L2/L1 decreased below 0.42, the discharge performance further degraded. This is considered to be because a decrease in L2/L1 causes a decrease in efficiency of current collection by the negative electrode current collector 6 in normal discharging. In view of the foregoing results, leakage can be further reduced when L2/L1 is 0.65 or less, and maintenance of discharge performance as well as further reduction of leakage can be achieved when L2/L1 is in the range from 0.42 to 0.65, both inclusive. That is, L2/L1 is 0.65 or less, and is more preferably in the range from 0.42 to 0.65, both inclusive.

Although not specifically described, advantages obtained by optimizing L2/L1 are not limited to the battery 9. In a battery in which the gelled negative electrode 3 has a predetermined malleability, leakage can be further reduced when L2/L1 is 0.65 or less, and maintenance of discharge performance as well as further reduction of leakage can be achieved when L2/L1 is in the range from 0.42 to 0.65, both inclusive. It is sufficient that L2/L1 is appropriately determined depending on the purpose of the alkaline primary battery, for example. The phrase of "the gelled negative electrode 3 has a predetermined malleability" means that the diameter of the extended gelled negative electrode 3 is in the range from 24 mm to 36 mm, both inclusive, when malleability of the gelled negative electrode 3 is measured with the method shown in FIG. 5.

As shown in FIG. 9(*b*), as the outer diameter of the negative electrode current collector 6 decreases, leakage becomes less likely to occur, as expected by the inventors. On the other hand, the inventors confirmed that when the outer diameter of the negative electrode current collector 6 decreases below 0.95 mm, it becomes difficult to keep the strength of the negative electrode current collector 6, and the negative electrode current collector 6 easily bends when the negative electrode current collector 6 is inserted into the gasket 5, for example. For this reason, the outer diameter of the negative electrode current collector 6 is preferably in the range from 0.95 mm to 1.40 mm, both inclusive.

Although not specifically described, advantages obtained by optimizing the outer diameter of the negative electrode current collector 6 are not limited to the battery 9. In a battery in which the gelled negative electrode 3 has a predetermined malleability, leakage can be further reduced without a decrease in strength of the negative electrode current collector 6 when the outer diameter of the negative electrode current collector 6 is in the range from 0.95 mm to 1.40 mm, both inclusive. The outer diameter of the negative electrode current collector 6 is appropriately determined depending on the purpose of the alkaline primary battery, for example.

The inventors conducted the following experiment in view of a mechanism (see FIG. 2) in which leakage occurs due to reverse connection.

First, the potential of manganese dioxide is optimized. Here, the potential of manganese dioxide is a potential with respect to Hg/HgO in 40 mass % of a KOH aqueous solution under a 20° C. environment. Various types of manganese dioxide having different potentials can be formed by forming electrolytic manganese dioxide with the electrolytic current density, the electrolytic temperature, and the concentration of the electrolyte appropriately adjusted. Specifically, first, 20.0 g of a manganese dioxide sample, 0.15 g of graphite powder (having an average particle size of 5 μm to 20 μm, e.g., SP-20M produced by Nippon Graphite Industries, ltd.), and 20 ml of 40 weight percent (wt. %) of a potassium hydroxide aqueous solution are put in a 50 ml centrifuge tube, mixed together, and left for 24 hours at 20° C. Thereafter, this centrifuge tube is centrifugalized (at 3000 rpm for 3 minutes) so that the manganese dioxide sample is deposited on the bottom of the centrifuge tube.

With 40 wt. % of the potassium hydroxide aqueous solution left in the centrifuge tube, a platinum electrode connected to a positive electrode of a digital voltmeter is brought into contact with the sediment of the manganese dioxide sample. Then, a reference electrode of mercurous oxide (Hg/HgO) connected to a negative electrode of the digital voltmeter is brought into contact with 40 wt. % of a potassium hydroxide aqueous solution (i.e., a supernatant liquid). Thereafter, the difference in potential between these electrodes is obtained.

When the potential of manganese dioxide increases, oxidation reaction of manganese dioxide (reaction (1)) finishes early. Accordingly, reaction (1) transitions to oxygen-gas generation reaction (reaction (4)) at an earlier time. On the other hand, even when the potential of manganese dioxide increases, the period of reduction reaction of zinc (reaction (2)) hardly changes. This phenomenon is considered to reduce the period of region II. In view of this, batteries (batteries 24-26 shown in FIG. 10(a)) different from the battery 9 only in the potential of manganese dioxide were fabricated, and were subjected to reverse-connection charging tests (where the discharge load was 4Ω and 40Ω, respectively) and a discharge performance test. FIG. 10(a) shows the results. As expected by the inventors, as the potential of manganese dioxide increased, the degree of reduction of leakage due to reverse connection increased. On the other hand, when the potential of manganese dioxide exceeded 330 mV, it became difficult to form manganese dioxide because formation of manganese dioxide needs a large amount of energy. For this reason, the potential of manganese dioxide is preferably in the range from 275 mV to 330 mV, both inclusive, and more preferably in the range from 304 mV to 330 mV, both inclusive.

Although not specifically described, advantages obtained by optimizing the potential of manganese dioxide are not limited to the battery 9. In a battery in which the gelled negative electrode 3 has a predetermined malleability, leakage can be further reduced when the potential of manganese dioxide is 275 mV or more, and reduction of energy necessary for formation of manganese dioxide as well as further reduction of leakage can be achieved when the potential of manganese dioxide is in the range from 275 mV to 330 mV, both inclusive. The potential of manganese dioxide is appropriately determined depending on the purpose of the alkaline primary battery, for example.

Next, the concentration of zinc oxide in the alkaline electrolyte (hereinafter referred to as the "zinc oxide concentration") was optimized. When the zinc oxide concentration increases, reduction reaction of zinc (reaction (2)) finishes later, and accordingly, hydrogen-gas generation reaction (reaction (3)) starts later. On the other hand, even when the zinc oxide concentration increases, the time when oxidation reaction of manganese dioxide (reaction (1)) transitions to oxygen-gas generation reaction (reaction (4)) hardly changes. For this reason, it can be considered that the period of hydrogen-gas generation reaction (the period of region II) is reduced. In view of this, batteries (batteries 27-30 shown in FIG. 10(b)) different from the battery 9 only in the zinc oxide concentration were fabricated, and were subjected to reverse-connection charging tests and a discharge performance test. FIG. 10(b) shows the results. As expected by the inventors, as the zinc oxide concentration increased, the degree of reduction of leakage due to reverse connection increased. However, as the zinc oxide concentration increased, the discharge performance degraded. Specifically, when the zinc oxide concentration was 3.0 mass %, the discharge performance degraded by about 5%. When the zinc oxide concentration exceeded 3.0 mass %, the discharge performance further degraded. This is considered to be because an increase in the zinc oxide concentration reduces the content of potassium hydroxide, and thus, it becomes difficult to maintain the concentration of hydroxide ions which contribute to battery reaction. From the foregoing results, leakage can be further reduced when the zinc oxide concentration is 1.7 mass % or more, and maintenance of discharge performance as well as further reduction of leakage can be achieved when the zinc oxide concentration is in the range from 1.7 to 3.0 mass %, both inclusive. That is, the zinc oxide concentration is preferably 1.7 mass % or more, and more preferably in the range from 1.7 to 3.0 mass %, both inclusive.

Although not specifically described, advantages obtained by optimizing the zinc oxide concentration are not limited to the battery 9. In a battery in which the gelled negative electrode 3 has a predetermined malleability, leakage can be further reduced when the zinc oxide concentration is 1.7 mass % or more, and maintenance of discharge performance as well as further reduction of leakage can be achieved when the zinc oxide concentration is in the range from 1.7 to 3.0 mass %, both inclusive. The zinc oxide concentration is appropriately determined depending on the purpose of the alkaline primary battery, for example.

Further, the amount of bismuth added to zinc (hereinafter referred to as the "amount of added bismuth") was optimized. It is expected that the amount of added bismuth increases, the corrosion resistance of zinc increases, and thus, hydrogen-gas generation reaction hardly occurs. In view of this, batteries (batteries 31-33 shown in FIG. 10(c)) different from the battery 9 only in the amount of added bismuth were fabricated, and were subjected to reverse-connection charging tests and a discharge performance test.

FIG. 10(c) shows the results of the experiment described above. As expected by the inventors, as the amount of added bismuth increased, the degree of reduction of leakage increased. However, as the amount of added bismuth increased, the discharge performance degraded. Specifically, when the amount of added bismuth was 250 mass ppm, the discharge performance degraded by about 5%. When the amount of added bismuth exceeded 250 mass ppm, the discharge performance further degraded. This is considered to be because an increase in the amount of added bismuth causes reduction in reactivity of zinc.

From the foregoing results, leakage can be further reduced when the amount of added bismuth is 80 mass ppm or more, and maintenance of discharge performance as well as further reduction of leakage can be achieved when the amount of added bismuth is in the range from 80 to 250 mass ppm, both inclusive. That is, the amount of added bismuth is preferably 80 mass ppm or more, and more preferably in the range from 80 to 250 mass ppm, both inclusive.

Although not specifically described, advantages obtained by optimizing the amount of added bismuth are not limited to the battery 9. In a battery in which the gelled negative electrode 3 has a predetermined malleability, leakage can be further reduced when the amount of added bismuth is 80 mass ppm or more, and maintenance of discharge performance as well as further reduction of leakage can be achieved when the amount of added bismuth is in the range from 80 to 250 mass ppm, both inclusive. The amount of added bismuth is appropriately determined depending on the purpose of the alkaline primary battery, for example.

In summary, in the alkaline primary battery of this embodiment, since the gelled negative electrode 3 is extended along the axis of the negative electrode current collector 6 under a pressure of a hydrogen gas generated due to reverse connection, the hydrogen gas remains on the surface of the negative electrode current collector 6 (see FIG. 1). Accordingly, resistance between the gelled negative electrode 3 and the negative electrode current collector 6 increases to cause a rapid decrease in charge current (indicated by C32 in FIG. 3). Thus, in the negative electrode, oxygen-gas consumption reaction (reaction (6)) more easily occurs than hydrogen-gas generation reaction (reaction (3)). Since the amount of hydrogen gas generation is reduced in this manner, an increase in the internal pressure of the battery can be reduced, resulting in reduction of leakage.

In addition, in the alkaline primary battery of this embodiment, the gas layer illustrated in FIG. 1 is formed on the surface of the negative electrode current collector 6 due to reverse connection. Accordingly, in the alkaline primary battery of this embodiment, leakage due to reverse connection can be reduced without degradation of characteristics (e.g., discharge characteristics) in normal discharging.

Further, the alkaline primary battery of this embodiment can be fabricated by optimizing at least one of the specific surface area of zinc alloy particles, the shape parameter of the zinc alloy particles, or the mass ratio of the zinc alloy to the electrolyte, for example. Thus, alkaline primary batteries showing reduced leakage can be manufactured.

A method for fabricating a battery 1 will be described hereinafter as an example method for fabricating a battery.

<1> Formation of Alkaline Electrolyte

Potassium hydroxide, zinc oxide, and water were mixed at a mass ratio of 35:1.7:63, thereby obtaining an alkaline electrolyte.

<2> Formation of Positive Electrode 2

Electrolytic manganese dioxide (having a potential of 275 mV) and graphite were mixed at a predetermined mass ratio. The obtained mixture and the alkaline electrolyte were mixed at a predetermined mass ratio, were sufficiently stirred, and then were sized to have a uniform grain size. The thus-obtained grain substance was press-formed into a hollow cylindrical shape, thereby obtaining a positive electrode material mixture pellet. The potential of electrolytic manganese dioxide was measured with the above-described method.

<3> Preparation of Gelled Negative Electrode 3

Zinc alloy particles were formed with a gas atomizing method such that the amount of added bismuth is 80 mass ppm, and were classified with a screen. Then, the zinc alloy particles were adjusted so as to have a BET specific surface area of 0.034 ($m^2/g$). The resultant zinc alloy particles had a shape parameter of 0.68.

Polyacrylic acid particles, sodium polyacrylic acid particles, an alkaline electrolyte, and zinc alloy particles were mixed at a mass ratio of 0.8:1.4:32.6:65.2. Further, 20 mass ppm of an organic anti-corrosive agent (Surflon S-386 produced by AGC Seimi Chemical Co., Ltd.) was added to the electrolyte. In this manner, a gelled negative electrode 3 was obtained.

<4> Assembly of Alkaline Battery

Two positive electrode material mixture pellets were inserted in a battery case 1, and a positive electrode 2 was pressurized by a pressing jig to be brought into close contact with the inner wall of the battery case 1. At this time, the outer diameter of the battery case 1 was 13.90 mm, and the thickness of the side wall of the battery case 1 was 0.18 mm.

Then, a closed-end cylindrical separator 4 was placed in a hollow part of the positive electrode 2. As the separator 4, nonwoven fabric in which polyvinyl alcohol fiber and rayon fiber were mixed as main components was used.

Subsequently, a predetermined mass of an alkaline electrolyte was poured in the separator 4. After a lapse of 15 minutes from the pouring, the separator 4 was filled with a predetermined mass of a gelled negative electrode 3.

Thereafter, an opening of the battery case 1 was sealed by a sealing member, and then the external surface of the battery case 1 was covered with an external label. At this time, a negative electrode current collector 6 having an outer diameter of 1.4 mm was inserted in the gelled negative electrode 3 such that L2/L1 was 0.65.

Other Embodiments

In the foregoing experiments, an AA alkaline primary battery was employed. However, the present disclosure is, of course, not limited to AA alkaline primary batteries.

Materials for the battery case 1 and the separator 4, compositions of the positive electrode 2 and the alkaline electrolyte, materials and shapes of the gasket 5, the negative electrode current collector 6, and the negative electrode terminal plate 7 are, of course, not limited to those described above.

The positive electrode 2 may be in close contact with the inner periphery of the battery case 1 with a graphite film interposed therebetween, or may contain a binder of, for example, polyethylene powder or a lubricant of, for example, stearate, as necessary.

The gelled negative electrode 3 preferably contains a trace amount of silicic acid or a silicon compound of its salt. In this case, generation of zinc dendrite can be reduced.

The surface of the negative electrode current collector 6 may be plated with tin or indium. This plating can prevent an impurity from being mixed into the negative electrode current collector 6 during processing of the negative electrode current collector 6, thereby obtaining a shielding effect.

INDUSTRIAL APPLICABILITY

The present disclosure is usable for power sources for various types of equipment.

DESCRIPTION OF REFERENCE CHARACTERS 1 battery case
2 positive electrode
3 gelled negative electrode
4 separator
5 gasket
6 negative electrode current collector
7 negative electrode terminal plate

The invention claimed is:

1. An alkaline primary battery, comprising:
a positive electrode containing manganese dioxide;
an alkaline electrolyte containing zinc oxide;
a gelled negative electrode containing zinc alloy particles, the alkaline electrolyte, and a gelling agent;
a negative electrode current collector inserted in the gelled negative electrode; and
a battery case containing the positive electrode, the alkaline electrolyte, the gelled negative electrode and the negative electrode current collector, wherein:
the gelled negative electrode has a predetermined malleability such that when 4.0 g of the gelled negative electrode formed into a cylindrical shape with a diameter of 15 mm is extended with 200 g of a load through 10 g of a flat plate, and then an upper surface of the extended gelled negative electrode is approximated to a circle, this circle has a diameter ranging from 24 mm to 36 mm, both inclusive,
the gelled negative electrode has a height L1 in the battery case and the negative electrode current collector inserted in the gelled negative electrode has a length L2, and
a value L2/L1 is in the range from 0.42 to 0.65, both inclusive.

2. The alkaline primary battery of claim 1, wherein a part of the negative electrode current collector inserted in the gelled negative electrode has an outer diameter ranging from 0.95 mm to 1.4 mm, both inclusive.

3. The alkaline primary battery of claim 1, wherein a potential of the manganese dioxide is 275 mV or more.

4. The alkaline primary battery of claim 1, wherein zinc oxide contained in the alkaline electrolyte has a concentration ranging from 1.7 mass % to 3.0 mass %, both inclusive.

5. The alkaline primary battery of claim 1, wherein the zinc alloy particles contain bismuth in a concentration ranging from 80 mass ppm to 250 mass ppm, both inclusive, with respect to zinc.

* * * * *